(12) United States Patent
Vo et al.

(10) Patent No.: US 11,651,540 B2
(45) Date of Patent: May 16, 2023

(54) LEARNING A REALISTIC AND ANIMATABLE FULL BODY HUMAN AVATAR FROM MONOCULAR VIDEO

(71) Applicant: Meta Platforms Technologies, LLC, Menlo Park, CA (US)

(72) Inventors: Minh Phuoc Vo, Larkspur, CA (US); Christoph Lassner, Mill Valley, CA (US); Carsten Sebastian Stoll, San Francisco, CA (US); Amit Raj, Atlanta, GA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 142 days.

(21) Appl. No.: 17/228,364

(22) Filed: Apr. 12, 2021

(65) Prior Publication Data
US 2022/0036626 A1 Feb. 3, 2022

Related U.S. Application Data

(60) Provisional application No. 63/070,043, filed on Aug. 25, 2020, provisional application No. 63/058,710, filed on Jul. 30, 2020.

(51) Int. Cl.
*G06T 7/70* (2017.01)
*G06T 7/90* (2017.01)
(Continued)

(52) U.S. Cl.
CPC .............. *G06T 13/40* (2013.01); *G06N 3/08* (2013.01); *G06T 7/70* (2017.01); *G06T 7/90* (2017.01);
(Continued)

(58) Field of Classification Search
CPC .. G06T 7/70; G06T 7/90; G06T 15/04; G06T 2207/30196
See application file for complete search history.

(56) References Cited

U.S. PATENT DOCUMENTS

2021/0358197 A1* 11/2021 Shysheya ................ G06T 15/04

FOREIGN PATENT DOCUMENTS

WO 2020096403 A1 5/2020

OTHER PUBLICATIONS

Aliev, et al., Neural Point-Based Graphics, arXiv:1906.08240v3, 16 pages, Apr. 5, 2020.
(Continued)

*Primary Examiner* — Matthew Salvucci
(74) *Attorney, Agent, or Firm* — Baker Botts L.L.P.

(57) ABSTRACT

In one embodiment, a method includes adjusting parameters of a three-dimensional geometry corresponding to a first person to make the three-dimensional geometry represent a desired pose for the first person, accessing a neural texture encoding an appearance of the first person, generating a first rendered neural texture based on a mapping between (1) a portion of the three-dimensional geometry that is visible from a viewing direction and (2) the neural texture, generating a second rendered neural texture by processing the first rendered neural texture using a first neural network, determining normal information associated with the portion of the three-dimensional geometry that is visible from the viewing direction, and generating a rendered image for the first person in the desired pose by processing the second rendered neural texture and the normal information using a second neural network.

20 Claims, 9 Drawing Sheets

(51) Int. Cl.
 G06T 13/40 (2011.01)
 G06T 15/04 (2011.01)
 G06T 15/50 (2011.01)
 G06N 3/08 (2023.01)
(52) U.S. Cl.
 CPC ............ *G06T 15/04* (2013.01); *G06T 15/503* (2013.01); *G06T 2207/10016* (2013.01); *G06T 2207/10024* (2013.01); *G06T 2207/20081* (2013.01); *G06T 2207/20084* (2013.01); *G06T 2207/30196* (2013.01)

(56) References Cited

OTHER PUBLICATIONS

Alldieck, et al., Learning to Reconstruct People in Clothing from a Single RGB Camera, In the IEEE Conference on Computer Vision and Pattern Recognition (CVPR), 12 pages.
Alldieck, et al., Video Based Reconstruction of 3d People Models, in the IEEE Conference on Computer Vision and Pattern Recognition (CVPR), 11 pages.
Alldieck, et al., Detailed Human Avatars from Monocular Video, arXiv:1808.01338v1, [cs.CV], pp. 1-12, Aug. 3, 2018.
Balakrishnan, et al., Synthesizing Images of Humans in Unseen Poses, in Proceedings of the IEEE Conference on Computer Vision and Pattern Recognition, pp. 8340-8348.
Cao, et al., OpenPose: Realtime Multi-Person 2d Pose Estimation Using Part Affinity Fields, arXiv preprint arXiv: 1812.08008v2, 14 pages, May 30, 2019.
Chan, et al., Everybody dance now, In Proceedings of the IEEE International Conference on Computer Vision, pp. 5933-5942.
Collet, et al., High-Quality Streamable Free-Viewpoint Video, ACM Transactions on Graphics, Article 69, 34(4):1-13, Aug. 2015.
Debevec, et al., Acquiring the Reflectance Field of a Human Face, in the SIGGRAPH 2000 Conference Proceedings, pp. 145-156, 2000.
Gong, et al., Instance-Level Human Parsing via Part Grouping Network, in Proceedings of the European Conference on Computer Vision (ECCV), 16 pages, 2018.
Grigorev, et al., Coordinate-Based Texture In-Painting for Pose-Guided Image Generation, arXiv preprint arXiv:1811.11459v2, 10 pages, Jul. 19, 2019.
Guo, et al., The Relightables: Volumetric Performance Capture of Humans with Realistic Relighting, ACM Transactions on Graphics, Article 217, 38(6):1-19, Nov. 2019.
Habermann, et al., Deepcap: Monocular human performance capture using weak supervision, in IEEE Conference on Computer Vision and Pattern Recognition (CVPR). IEEE, 12 pages, 2020.
Huang, et al., Adversarial Texture Optimization From RGB-D Scans, in Proceedings of the IEEE/CVF Conference on Computer Vision and Pattern Recognition, pp. 1559-1568, 2020.
Huang, et al., Arch: Animatable Reconstruction of Clothed Humans, in CVPR paper, pp. 3093-3102, 2020.
Isola, et al., Image-to-Image Translation with Conditional Adversarial Networks, in CVPR, pp. 1125-1134.
Johnson, et al., Perceptual Losses for Real-Time Style Transfer and Super-Resolution, arXiv:1603.08155v1, 18 pages, Mar. 27, 2016.
Joo, et al., Panoptic Studio: A Massively Multiview System for Social Motion Capture, in ICCV paper, pp. 3334-3342.
Kanazawa, et al., End-to-end Recovery of Human Shape and Pose, in CVPR paper, pp. 7122-7131.
Kanazawa, et al., Learning Category-Specific Mesh Reconstruction from Linage Collections, in ECCV paper, pp. 1-16, 2018.
Kanazawa, et al., Learning 3D Human Dynamics from Video, in CVPR paper, pp. 5614-5623.
Kato, et al., Neural 3D Mesh Renderer, in CVPR paper, pp. 3907-3916.
Kingma, et al., Adam: A Method for Stochastic Optimization, published as a conferenced paper at ICLR, 15 pages, 2015.
Lassner, et al., A Generative Model of People in Clothing, in Proceedings of the IEEE International Conference on Computer Vision, pp. 853-862.
Lassner, et al., Unite the People: Closing the Loop Between 3D and 2D Human Representations, in CVPR paper, pp. 6050-6059.
Liu, et al., Neural Rendering and Reenactment of Human Actor Videos, Article 282, 1(1):1-14, May 2018.
Liu, et al., Liquid Warping GAN: A Unified Framework for Human Motion Imitation, Appearance Transfer and Novel View Synthesis, in the IEEE International Conference on Computer Vision (ICCV), pp. 5904-5913.
Liu, et al., Soft Rasterizer: Differentiable Rendering for Unsupervised Single-View Mesh Reconstruction, arXiv:1901.05567v2 [cs.CV], pp. 4321-4330, Jan. 23, 2019.
Lombardi, et al., Deep Appearance Models for Face Rendering, ACM Transactions on Graphics, 37(4):1-13, Aug. 2018.
Lombardi, et al., Neural Volumes: Learning Dynamic Renderable Volumes from Images, ACM Transactions on Graphics, Article 65, 38(4):1-14, Jul. 2019.
Loper, et al., SMPL: A Skinned Multi-Person Linear Model, ACM Trans. On Graphics, Article 248, 34(6):1-16, Nov. 2015.
Ma, et al., Pose Guided Person Image Generation, in Advances in Neural Information Processing Systems, 17 pages, 2017.
Ma, et al., Disentangled person image generation, in Proceedings of the IEEE Conference on Computer Vision and Pattern Recognition, pp. 99-108.
Martin-Brualla, et al., Gelato: Generative Latent Textured Objects, arXiv:2008.04852v1, 18 pages, Aug. 2020.
Martin-Brualla, et al., LookinGood: Enhancing Performance Capture with Real-Time Neural Re-Rendering, ACM Transactions on Graphics, Article 255, 37(6):1-14, Nov. 2018.
Mildenhall, et al., NeRF: Representing Scenes as Neural Radiance Fields for View Synthesis, 25 pages, Aug. 3, 2020.
Nagano, et al., Deep Face Normalization, ACM Transactions on Graphics, Article 183, 38(6):1-16, Nov. 2019.
Neverova, et al., Dense Pose Transfer, in Proceedings of the European conference on computer vision (ECCV), 16 pages, 2018.
Omranl, et al., Neural Body Fitting: Unifying Deep Learning and Model-Based Human Pose and Shape Estimation, arXiv:18n8.05942v1 [cs.CV], pp. 1-13, Aug. 17, 2018.
Pandey, et al., Volumetric Capture of Humans with a Single RGBD Camera via Semi-Parametric Learning, in Proceedings of the IEEE Conference on Computer Vision and Pattern Recognition, pp. 9709-9718.
Raj, et al., ANR: Articulated Neural Rendering for Virtual Avatars, arXiv:2012.12890v1, 10 pages, Dec. 23, 2020.
Raj, et al., SwapNet: Image Based Garment Transfer, in European Conference on Computer Vision, 17 pages, 2018.
Ronneberger, et al., U-net: Convolutional Networks for Biomedical Image Segmentation, arXiv:1505.04597v1, 8 pages, May 18, 2015.
Saito, et al., Pifuhd: Multi-Level Pixel-Aligned Implicit Function for High-Resolution 3d Human Digitization, in Proceedings of the IEEE Conference on Computer Vision and Pattern Recognition, pp. 84-93, 2020.
Shysheya, et al., Textured Neural Avatars, in Proceedings of the IEEE Conference on Computer Vision and Pattern Recognition, pp. 2387-2397.
Si, et al., Multistage Adversarial Losses for Pose-Based Human Image Synthesis, in Proceedings of the IEEE Conference on Computer Vision and Pattern Recognition, pp. 118-126.
Thies, et al., Deferred Neural Rendering: Image Synthesis Using Neural Textures, arXiv:1904.12356v1, pp. 1-12, Apr. 28, 2019.
Tung, et al., Self-supervised Learning of Motion Capture, 31st Conference on Neural Information Processing Systems (NIPS 2017), Long Beach, CA, pp. 1-11, Dec. 4, 2017.
Walsman, et al., Dynamic High Resolution Deformable Articulated Tracking, in arXiv:1711.07999v1, pp. 1-10, Nov. 21, 2017.
Wang, et al., Video-to-video synthesis, arXiv:1808.06601v2, pp. 1-14, Dec. 3, 2018.
Wang et al., High-Resolution Image Synthesis and Semantic Manipulation with Conditional Gans, in CVPR, pp. 8798-8807.

(56) References Cited

OTHER PUBLICATIONS

Zanfir, et al., Human Appearance Transfer, in Proceedings of the IEEE Conference on Computer Vision and Pattern Recognition, pp. 5391-5399.
Zhao, et al., Multi-view Image Generation from a Single-View, arXiv:1704.04886v4, pp. 1-9, Feb. 27, 2018.
Zhi, et al., Texmesh: Reconstructing Detailed Human Texture and Geometry from RGB-D Video, arXiv:2008.00158v3, pp. 1-23, Sep. 21, 2020.
Zuffi, et al., Lions and Tigers and Bears: Capturing Non-Rigid, 3D, Articulated Shape from Images, in CVPR paper, pp. 3955-3963.
International Search Report and Written Opinion for International Application No. PCT/US2021/043095, dated Nov. 19, 2021, 11 pages.

* cited by examiner

LEARNING A REALISTIC AND ANIMATABLE FULL BODY HUMAN AVATAR FROM MONOCULAR VIDEO

PRIORITY

This application claims the benefit under 35 U.S.C. § 119(e) of U.S. Provisional Patent Application No. 63/058,710, filed 30 Jul. 2020, which is incorporated herein by reference. This application claims the benefit under 35 U.S.C. § 119(e) of U.S. Provisional Patent Application No. 63/070,043, filed 25 Aug. 2020, which is incorporated herein by reference.

TECHNICAL FIELD

This disclosure generally relates to three-dimensional image processing, and in particular, related to three-dimensional reconstructions of a human body.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for rendering a high-quality virtual human avatar from a coarse three-dimensional geometry constructed based on a video stream of a person taken from various viewing directions. Traditional approaches for capturing realistic appearance may require expensive and complicated capture setups. Those setups may prevent easy digitization and transfer of the resulting models. The methods disclosed herein may employ a simple statistical human body model fitted to a training video to capture the body shape statistics and three-dimensional pose information for each frame. This body model may only represent the coarse body geometry without clothing and hair. The body geometry may be rasterized onto the image plane and painted with a neural latent texture which may be then translated to a red, green, and blue (RGB) image using a convolutional rendering network. Both the rendering network and the neural texture may be optimized to produce realistic results with view-dependent effects. To avoid unrealistic, blurry texture rendering, the methods may determine keyframes from the video that represent the static appearance. The neural texture may be optimized with only the determined keyframes. The other frames may be used for learning the pose-conditioned rendering of the appearance. With this approach, the methods disclosed herein may account for geometric misalignment of the coarse body geometry and pose-dependent deformation. The rendering network may be simultaneously trained on multiple identities, which may lead to a strong decoupling of the neural texture and the rendering network. As a result, a system may capture and render multiple identities with only one set of rendering network parameters in addition to an identity specific neural texture map. Because of consistent surface parameterization of the statistical body model, the system may leverage such semantic correspondences to modify and mix components from multiple neural textures. For example, the method may be used for virtual try-on by changing regions in the neural texture. The trained rendering model along with the neural texture may be used for animating an avatar when a range of motion is well-known or can be estimated well. The examples may include, but not limited to, virtual assistants or game characters.

In particular embodiments, a computing device may adjusting parameters of a three-dimensional geometry corresponding to a first person to make the three-dimensional geometry represent a desired pose for the first person. In particular embodiments, the three-dimensional geometry may be constructed by interpolating three-dimensional geometries representing known poses for the first person. In particular embodiments, the three-dimensional geometry may be constructed based on a three-dimensional geometry representing the desired pose for a second person. The computing device may access a neural texture encoding an appearance of the first person. Each texel of the neural texture may have k-channel latent representation. The computing device may generate a first rendered neural texture based on a mapping between (1) a portion of the three-dimensional geometry that is visible from a viewing direction and (2) the neural texture. The first rendered neural texture may comprise latent channels. The computing device may generate a second rendered neural texture by processing the first rendered neural texture using a first neural network. The second rendered neural texture may comprise color channels and latent channels. The computing device may determine normal information associated with the portion of the three-dimensional geometry that is visible from the viewing direction. The computing device may generate a rendered image for the first person in the desired pose by processing the second rendered neural texture and the normal information using a second neural network. The second neural network may also produce a mask that is used for blending the generated rendered image for the first person in the desired pose with a background. In particular embodiments, the rendered image for the first person may be modified by swapping at least a part of the neural texture with the corresponding part of a neural texture encoding an appearance of a second person. The neural texture encoding the appearance of the first person and the neural texture encoding the appearance of the second person may have been simultaneously trained along with the first neural network and the second neural network.

In particular embodiments, the neural texture encoding the appearance of the first person, the first neural network, and the second neural network may be trained with a video stream of the first person taken from various viewing directions. A process for training the neural texture encoding the appearance of the first person, the first neural network, and the second neural network may comprise as follows: At first step, the computing device may access the video stream of the first person taken from various viewing directions. Each frame of the video stream may comprise an image with color channels. At second step, the computing device may determine keyframes among a plurality of frames of the video stream that capture static salient appearances of the first person in the video stream. Each determined keyframe may be associated with a distinctive viewing direction. At third step, the computing device may, for each of the determined keyframes, update parameters of the neural texture, the first neural network, and the second neural network based on calculated losses based on a comparison between a generated training rendered image of the first person in a training pose shown in the frame using the neural texture, the first neural network, and the second neural network and a ground truth image of the first person in the frame. The calculated losses may comprise an RGB loss, a feature loss, an adversarial loss, or a mask loss. The RGB loss may be calculated based on a comparison between RGB channels of the generated training rendered image and RGB channels of the ground truth image of the first person in the frame. The feature loss may be calculated based on a comparison between latent features extracted from the generated training rendered image and latent features extracted from the ground truth image of the first person in the frame. The adversarial loss may be used for training a binary classifier classifying ground truth data and generated data. The mask loss may be calculated based on a comparison between a mask generated by the second neural network and an area for the person in the ground truth image of the first person in the frame. The computing device may, in order to generate the training rendered image for the first person in the training pose shown in the frame, construct a three-dimensional training geometry to represent the first person in a training pose shown in the frame based on a body shape model. The computing device may generate a first training rendered neural texture based on a mapping between (1) a portion of the three-dimensional training geometry that is visible from a viewing direction of the frame and (2) the neural texture. The computing device may generate a second training rendered neural texture by processing the first training rendered neural texture using the first neural network. The second training rendered neural texture may comprise k-channels. First three channels of the k-channels of the second training rendered neural texture may be color channels. The rest k–3 channels among the k-channels of the second training rendered neural texture may be latent representation channels. The first three channels of the k-channels of the second training rendered neural texture may be enforced to be color channels by comparing the first three channels of the k-channels of the second training rendered neural texture with color channels of the frame as a part of calculating the losses. The computing device may determine training normal information associated with the portion of the three-dimensional training geometry that is visible from the viewing direction. The computing device may generate the training rendered image for the first person in the training pose by processing the second training rendered neural texture and the training normal information using the second neural network. In particular embodiments, the first neural network and the second neural network may be further trained using non-keyframes among the plurality of frames of the video stream after the training of the neural texture, the first neural network, and the second neural network using the determined keyframes is completed. The neural texture optimized with the keyframes may be used for training the first neural network and the second neural network with the non-keyframes.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
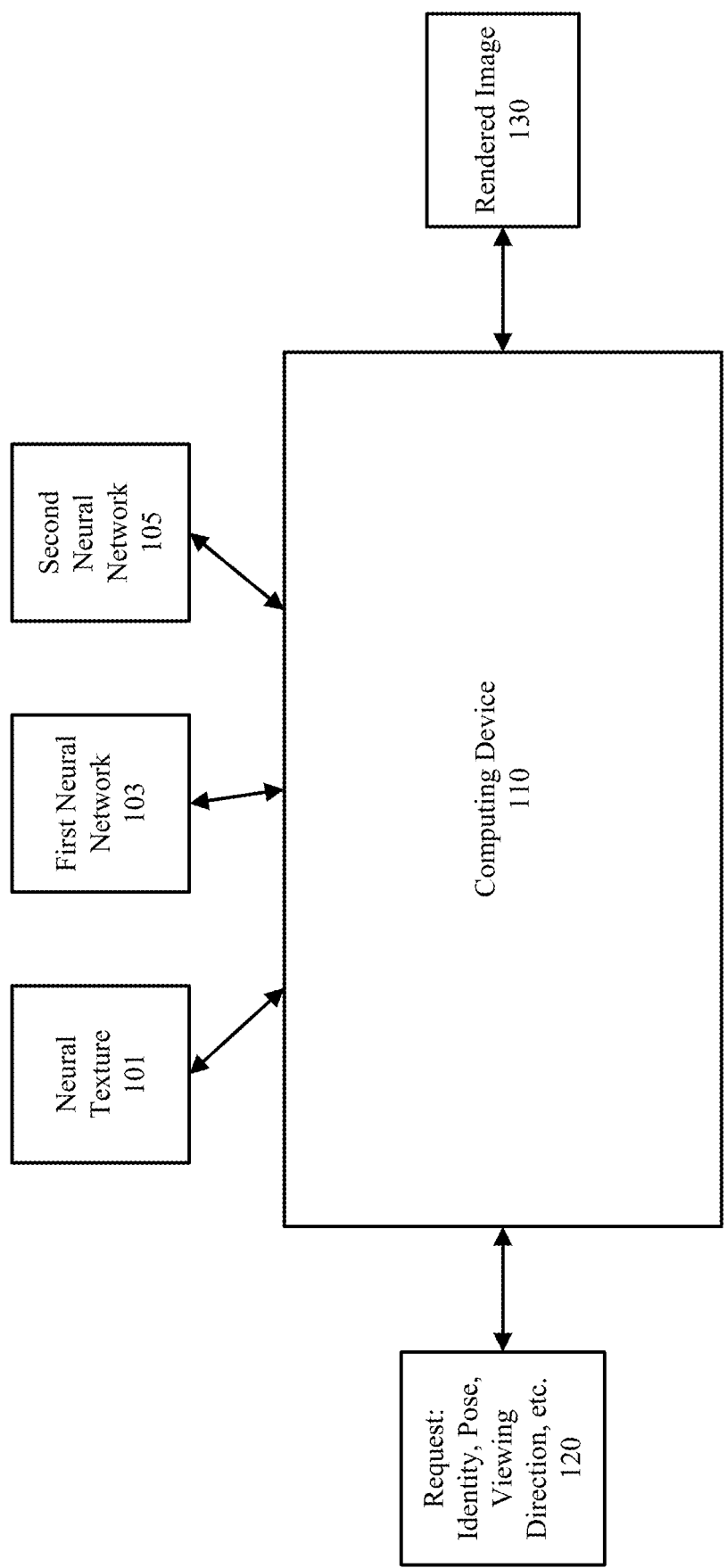
FIG. 1 illustrates an example architecture for rendering a virtual human avatar using neural texture, a first neural network, and a second neural network trained using a video stream of a person taken from various viewing directions.

FIG. 1 illustrates an example architecture for rendering a virtual human avatar using neural texture, a first neural network, and a second neural network trained using a video stream of a person taken from various viewing directions. A computing device 110 may access neural texture 101, a first neural network 103, and a second neural network 105. The neural texture 101, the first neural network 103, and the second neural network 105 may have been pre-trained with a video stream of a first person taken from virous viewing directions. The computing device 110 may receive a request 120 to generate a virtual avatar for the first person in a desired pose viewed from a desired viewing direction. The computing device 110 may adjust parameters of a three-dimensional geometry corresponding to the first person to make the three-dimensional geometry represent the desired pose for the first person. The computing device 110 may access the neural texture 101 encoding an appearance of the first person. The computing device 110 may generate a first rendered neural texture based on a mapping between (1) a portion of the three-dimensional geometry that is visible from the desired viewing direction and (2) the neural texture 101. The computing device 110 may generate a second rendered neural texture by processing the first rendered neural texture using the first neural network 103. The computing device 110 may determine normal information associated with the portion of the three-dimensional geometry that is visible from the desired viewing direction. The computing device 110 may generate a rendered image 130 for the first person in the desired pose by processing the second rendered neural texture and the normal information using the second neural network 105. Although this disclosure describes a particular architecture for rendering a virtual human avatar using neural texture, a first neural network, and a second neural network, this disclosure contemplates any suitable architecture for rendering a virtual human avatar using neural texture, a first neural network, and a second neural network.

In particular embodiments, the neural texture 101 encoding the appearance of the first person, the first neural network 103, and the second neural network 105 may be trained with a video stream of the first person taken from various viewing directions. A process for training the neural texture 101 encoding the appearance of the first person, the first neural network 103, and the second neural network 105 may comprise as follows: At first step, the computing device 110 may access the video stream of the first person taken from various viewing directions. Each frame of the video stream may comprise an image with color channels. In particular embodiments, the image may also comprise a depth channel. At second step, the computing device 110 may determine keyframes among a plurality of frames of the video stream that capture static salient appearances of the first person in the video stream. Each determined keyframe may be associated with a distinctive viewing direction. The computing device 110 may select the keyframes by greedily adding a small number of frames in the video sequence such that their cumulative silhouette coverage is maximized. This selection of keyframes may ensure that the entire pose-space is adequately covered to capture texture details at all locations on the body. At third step, the computing device 110 may, for each of the determined keyframes, update parameters of the neural texture 101, the first neural network 103, and the second neural network 105 based on losses calculated based on a comparison between a generated training rendered image of the first person in a training pose shown in the frame using the neural texture 101, the first neural network 103, and the second neural network 105 and a ground truth image of the first person in the frame. Although this disclosure describes training the neural texture, the first neural network, and the second neural network in a particular manner, this disclosure contemplates training the neural texture, the first neural network, and the second neural network in any suitable manner.

Figure 2:
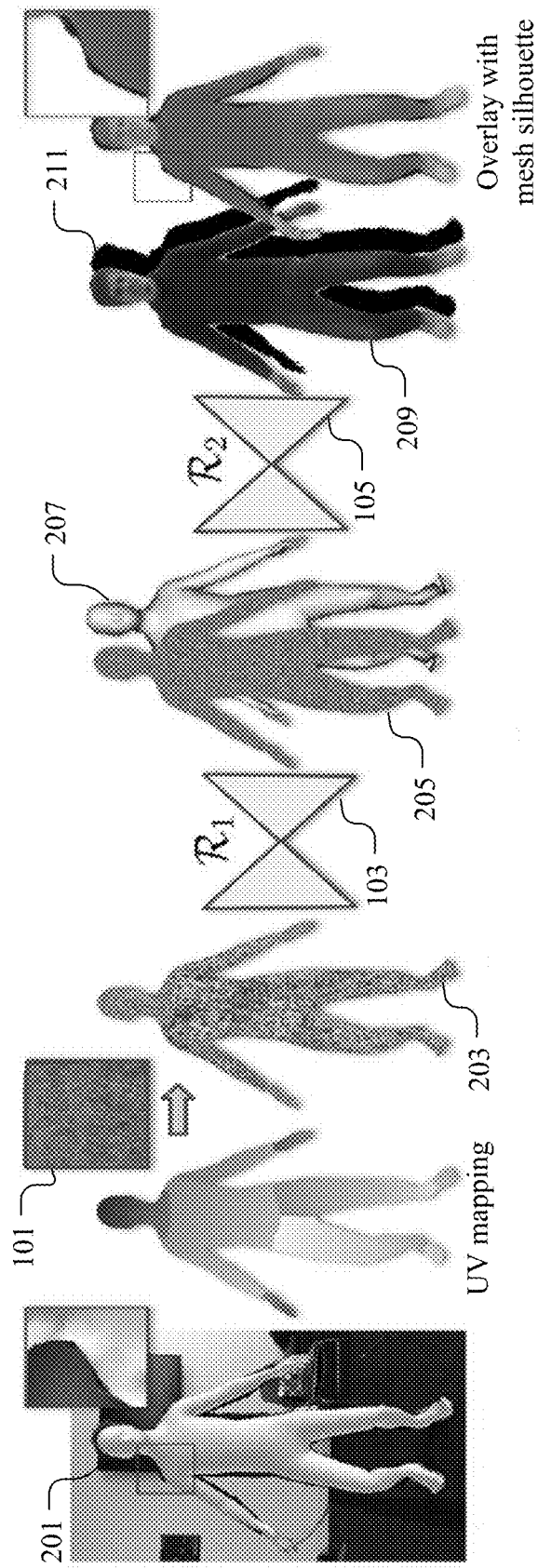
FIG. 2 illustrates an example pipeline for training the neural texture, the first neural network, and the second neural network using a video stream of a person taken from various viewing directions.

FIG. 2 illustrates an example pipeline for training the neural texture, the first neural network, and the second neural network using a video stream of a person taken from various viewing directions. At a beginning of the training, parameters for the neural texture 101, the first neural network 103, and the second neural network 105 may be randomly initialized. For an iteration of the training process, the computing device 110 may generate a training rendered image 209 for the first person in the training pose shown in the frame. To generate the training rendered image 209, the computing device 110 may construct a three-dimensional training geometry 201 to represent the first person in a training pose shown in the frame based on a body shape model. In particular embodiments, the three-dimensional training geometry 201 (e.g., a coarse mesh representation) may be obtained by solving an inverse kinematic problem to fit the posed body shape to a 3D point cloud. The computing device 110 may also use additional detected body keypoints to construct the three-dimensional training geometry 201. The computing device 110 may generate a first training rendered neural texture 203 based on a UV mapping between (1) a portion of the three-dimensional training geometry 201 that is visible from a viewing direction of the frame and (2) the neural texture 101. Each texel of the neural texture 101 may have k-channel latent representation. Therefore, the first training rendered neural texture 203 may also comprise k latent channels. Although this disclosure describes generating the first training rendered neural texture during a training of the neural texture, the first neural network, and the second neural network in a particular manner, this disclosure contemplates generating the first training rendered neural texture during a training of the neural texture, the first neural network, and the second neural network in any suitable manner.

Figure 3:
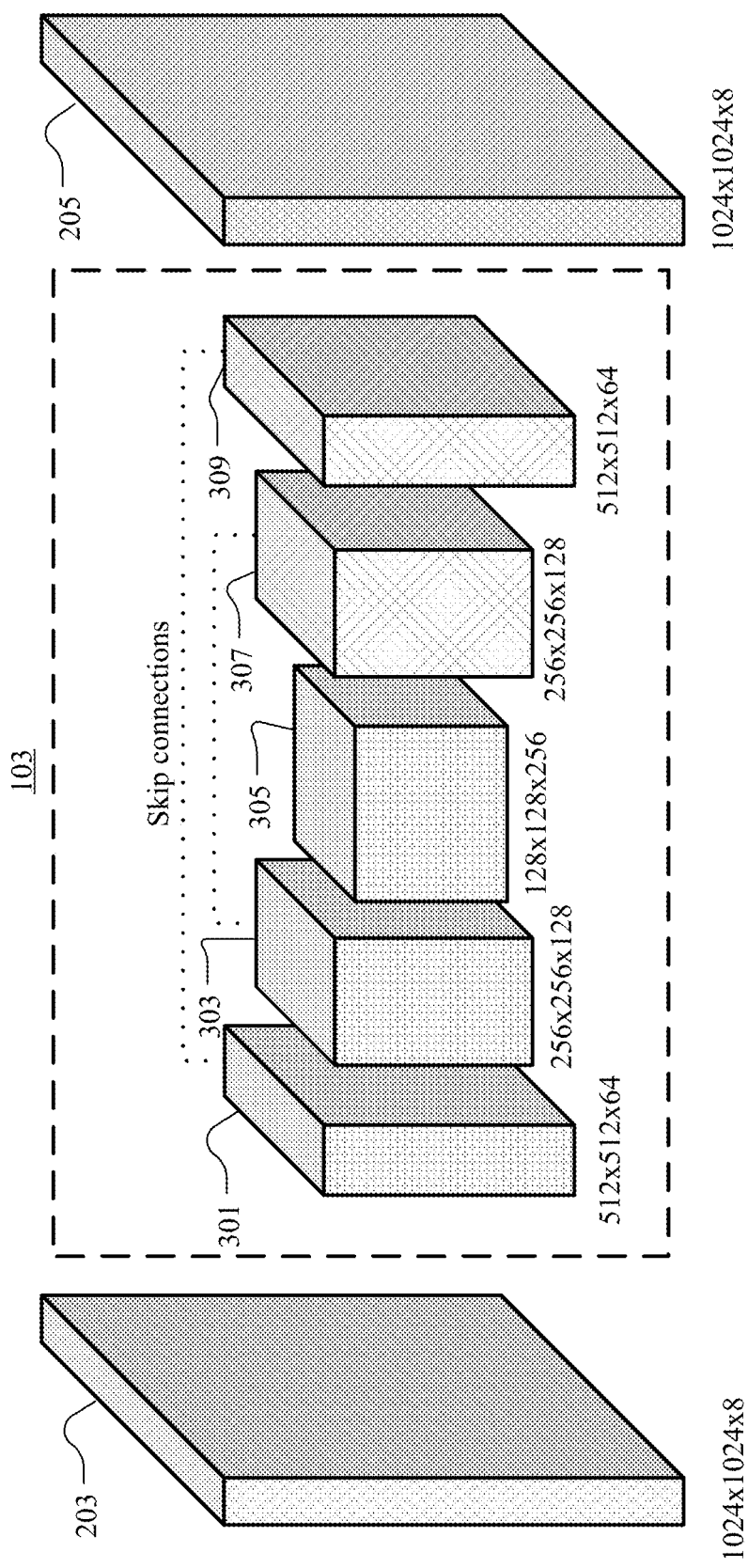
FIG. 3 illustrates an example architecture of the first neural network.

In particular embodiments, the computing device 110 may generate a second training rendered neural texture 205 by processing the first training rendered neural texture 203 using the first neural network 103. FIG. 3 illustrates an example architecture of the first neural network 103. As an example and not by way of limitation, illustrated in FIG. 3, the first neural network 103 may be a variant of U-Net architecture. The first neural network 103 may take a first rendered neural texture 203, which comprises 8 channels in the example illustrated in FIG. 3, as input and produce a second rendered neural texture 205, which also comprises 8 channels in the example, as output. The first neural network 103 may comprise three convolutional encoding layers 301, 303, and 305, with Rectified Linear Unit (ReLU) activations and two bilinear up-sampling convolutional decoding layers, 307 and 309, with ReLU activations. The convolutional encoding layer 301 may have a skip connection with the convolutional decoding layer 309, and the convolutional encoding layer 303 may have a skip connection with the convolutional decoding layer 307. Although this disclosure describes a particular architecture of the first neural network, this disclosure contemplates any suitable architecture of the first neural network.

In particular embodiments, the second training rendered neural texture 205 may comprise k-channels. First three channels of the k-channels of the second training rendered neural texture 205 may be color channels (e.g., RGB channels). The rest k–3 channels among the k-channels of the second training rendered neural texture 205 may be latent representation channels. The first three channels of the k-channels of the second training rendered neural texture 205 may be enforced to be color channels by comparing the first three channels of the k-channels of the second training rendered neural texture 205 with color channels of a ground truth image corresponding to the frame as a part of calculating the losses. As an example and not by way of limitation, continuing with a prior example illustrated in FIG. 3, the second training rendered neural texture 205 may comprise 8 channels. The first 3 channels may be RGB channels, and the rest 5 channels may be latent representation channels. In a process of backpropagation, the computing device 110 may calculate a loss by comparing the first three channels of the second training rendered neural texture 205 and RGB channels of the ground truth image corresponding to the frame. As the computing device 110 update the parameters based on the calculated loss, the first three channels of the second training rendered neural texture 205 may be enforced to be RGB channels. Although this disclosure describes enforcing the first three channels of the second training rendered neural texture to be color channels in a particular manner, this disclosure contemplates enforcing the first three channels of the second training rendered neural texture to be color channels in any suitable manner.

Figure 4:
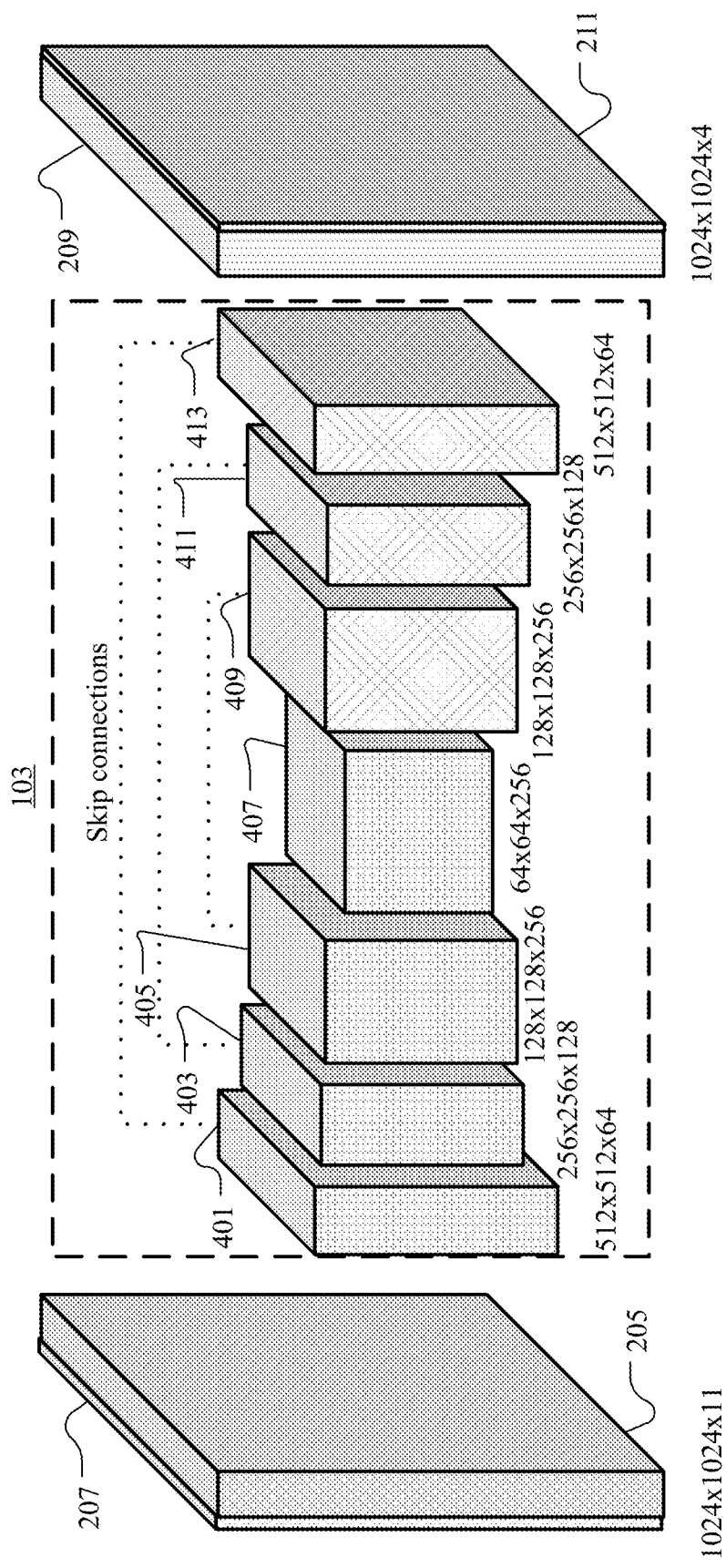
FIG. 4 illustrates an example architecture of the second neural network.

In particular embodiments, the computing device 110 may determine training normal information 207 associated with the portion of the three-dimensional training geometry 201 that is visible from the viewing direction. The computing device 110 may generate the training rendered image 209 for the first person in the training pose by processing the second training rendered neural texture 205 and the training normal information 207 using the second neural network 105. FIG. 4 illustrates an example architecture of the second neural network 105. As an example and not by way of limitation, illustrated in FIG. 4, the second neural network 105 may be a variant of U-Net architecture. The second neural network 105 may take the second training rendered neural texture 205, which was produced by the first neural network 103, and the determined training normal information 207 as input. The second training rendered neural texture 205 comprises 8 channels, and the training normal information 207 comprises 3 channels. Thus, the input to the second neural network 105 may comprise 11 channels in the example illustrated in FIG. 4. The second neural network 105 may produce a training rendered image 209 and a training bounding mask 211 as output. The second neural network 105 may comprise four convolutional encoding layers 401, 403, 405, and 407, with ReLU activations and three bilinear up-sampling convolutional decoding layers, 409, 411, and 413, with ReLU activations. The convolutional encoding layer 401 may have a skip connection with the convolutional decoding layer 413, the convolutional encoding layer 403 may have a skip connection with the convolutional decoding layer 411, and the convolutional encoding layer 405 may have a skip connection with the convolutional decoding layer 409. Although this disclosure describes a particular architecture of the second neural network, this disclosure contemplates any suitable architecture of the second neural network.

In particular embodiments, the computing device 110 may update parameters of the neural texture 101, the first neural network 103, and the second neural network 105 based on losses calculated based on a comparison between the generated training rendered image 209 and a ground truth image corresponding to the frame. As a simple loss function may deteriorate performance of the system as the training progresses, an adversarial learning and feature loss computations may be used to guide the model to generate realistic and accurate appearance without having to rely on accurate registration. The loss function utilized for the training may be a weighted sum of an RGB loss, a feature loss, a mask loss, an adversarial loss, and a total variation loss. The RGB loss for the second training rendered neural texture 205 may be used with a constant weight, a weight for the generated training rendered image 209 may be relaxed as the training progresses. In particular embodiments, the calculated losses may comprise a red, green, and blue (RGB) loss, a feature loss, an adversarial loss, or a mask loss. The RGB loss may be calculated based on a comparison between RGB channels of the generated training rendered image 209 and of the second training rendered neural texture 205 and RGB channels of the ground truth image of the first person in the frame. The feature loss may be calculated based on a comparison between latent features extracted from the generated training rendered image and latent features extracted from the ground truth image of the first person in the frame. The adversarial loss may be used for training a binary classifier classifying ground truth data and generated data. The mask loss may be calculated based on a comparison between the mask 211 generated by the second neural network 105 and an area for the person in the ground truth image of the first person in the frame. Although this disclosure describes calculating losses during a training of the neural texture, the first neural network, and the second neural network in a particular manner, this disclosure contemplates calculating losses during a training of the neural texture, the first neural network, and the second neural network in any suitable manner.

In particular embodiments, the first neural network 103 and the second neural network 105 may be further trained using non-keyframes among the plurality of frames of the video stream after the training of the neural texture 101, the first neural network 103, and the second neural network 105 using the determined keyframes is completed. The neural texture 101 optimized with the keyframes may be used for training the first neural network 103 and the second neural network 105 with the non-keyframes. Using a relatively small number of keyframes (e.g., less than 10% of entire frames) may reduce the texture averaging. The empirical observations show that training with the keyframes first may help the neural networks converge up to 5 times faster and produce quantitatively better avatars. Although this disclosure describes splitting a training of the neural texture, the first neural network and the second neural network with keyframes from a training of the first neural network and the second neural network with non-keyframes in a particular manner, this disclosure contemplates splitting a training of the neural texture, the first neural network and the second neural network with keyframes from a training of the first neural network and the second neural network with non-keyframes in any suitable manner.

Figure 5:
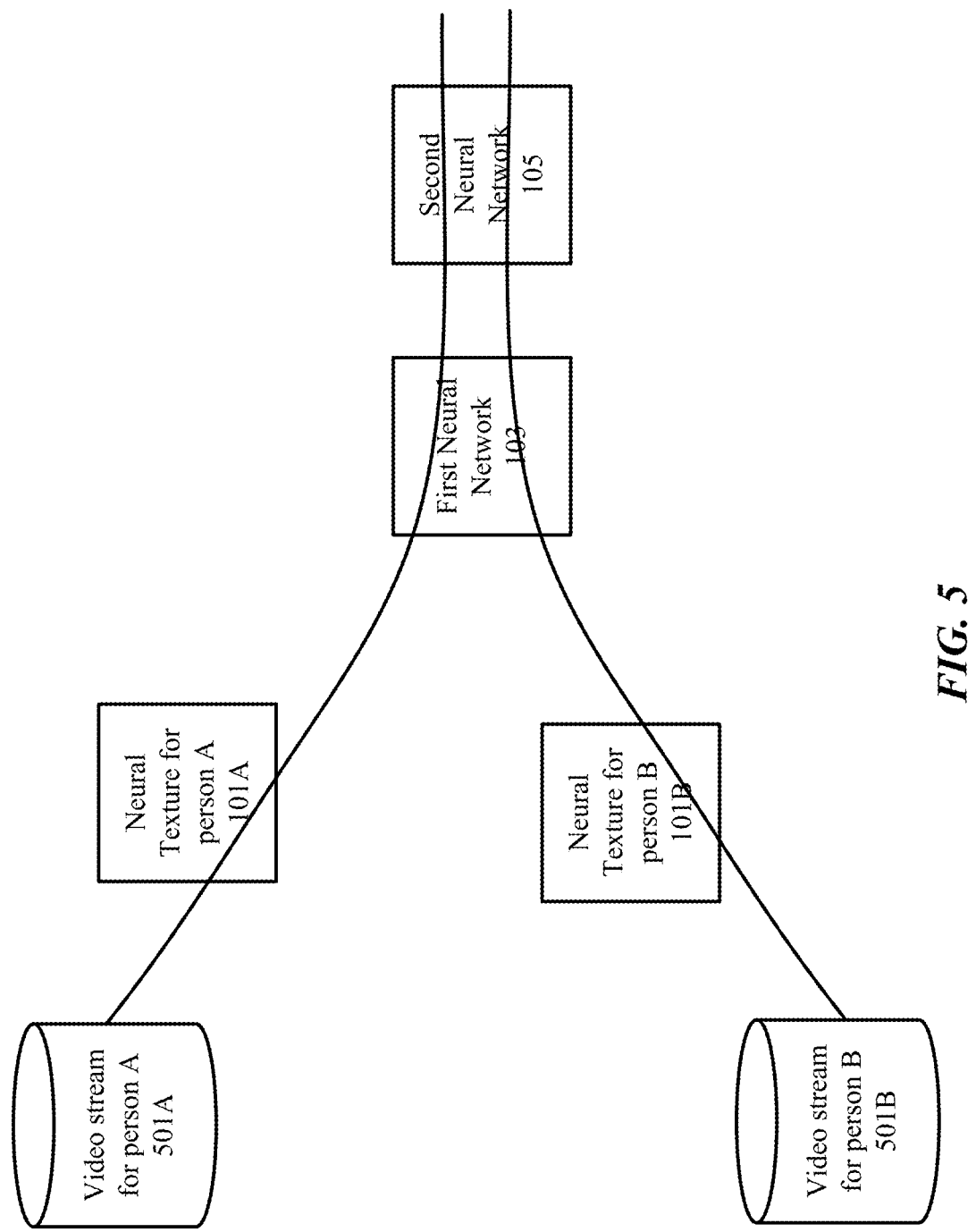
FIG. 5 illustrates an example training of the first neural network and the second neural network along with multiple neural textures corresponding to multiple persons.

In particular embodiments, The neural texture 101A encoding the appearance of the first person and the neural texture 101B encoding the appearance of a second person may have been simultaneously trained along with the first neural network 103 and the second neural network 105. FIG. 5 illustrates an example training of the first neural network and the second neural network along with multiple neural textures corresponding to multiple persons. As an example and not by way of limitation, illustrated in FIG. 5, the computing device 110 may train the first neural network 103 and the second neural network 105 using two video streams: a first video stream 501A of a first person taken from various viewing directions and a second video stream 501B of a second person taken from various viewing directions. The computing device 110 may prepare a randomly initialized neural texture 101A for the first person and a randomly initialized neural texture 101B for the second person before initiating the training. The computing device 110 may simultaneously train the neural texture 101A and the neural texture 101B along with the shared first neural network 103 and the second neural network 105 using the video streams 501A and 501B as training data. As another example and not by way of limitation, the computing device 110 may simultaneously train neural textures for any number of persons. Although this disclosure describes simultaneously training multiple neural textures along with the shared first neural network and second neural network in a particular manner, this disclosure contemplates simultaneously training multiple neural textures along with the shared first neural network and second neural network in any suitable manner.

In particular embodiments, after finishing the training of the neural texture 101, the first neural network 103, and the second neural network 105, the computing device 110 may generate a virtually rendered image of the first person in a desired pose shown from a desired viewing direction. The computing device 110 may adjust parameters of a three-dimensional geometry 201 to make the three-dimensional geometry 201 represent the desired pose for the first person. In particular embodiments, the parameters of the three-dimensional geometry 201 may be adjusted by interpolating three-dimensional geometries representing known poses for the first person. In particular embodiments, the parameters of the three-dimensional geometry 201 may be adjusted based on a three-dimensional geometry representing the desired pose for a second person. Although this disclosure describes adjusting parameters of a three-dimensional geometry to make the three-dimensional geometry represent a desired pose for a person in a particular manner, this disclosure contemplates adjusting parameters of a three-dimensional geometry to make the three-dimensional geometry represent a desired pose for a person in any suitable manner.

In particular embodiments, the computing device 110 may access the neural texture 101 trained to encode an appearance of the first person. Each texel of the neural texture 101 may have k-channel latent representation. The computing device 110 may generate a first rendered neural texture 203 based on a mapping between a portion of the three-dimensional geometry 201 that is visible from the desired viewing direction and the neural texture 101. The first rendered neural texture 203 may comprise k latent channels. Although this disclosure describes generating a first rendered neural texture in a particular manner, this disclosure contemplates generating a first rendered neural texture in any suitable manner.

In particular embodiments, the computing device 110 may generate a second rendered neural texture 205 by processing the first rendered neural texture 203 using the first neural network 103. The first neural network 103 may have been trained using a video stream of the first person taken from various viewing directions as training data. The second rendered neural texture 205 may comprise three color channels and latent channels. The first three channels of the second rendered neural texture 205 may be enforced to be color channels during the training due to an RGB loss calculated based on a comparison between the first three channels of the second rendered neural texture 205 and the color channels of a ground truth image corresponding to the frame. Although this disclosure describes generating a second rendered neural texture in a particular manner, this disclosure contemplates generating a second rendered neural texture in any suitable manner.

In particular embodiments, the computing device 110 may determine normal information 207 associated with the portion of the three-dimensional geometry 201 that is visible from the desired viewing direction. In particular embodiments, the normal information 207 may comprise three channels. When the three-dimensional geometry 201 represents a known pose of the first person, the computing device 110 may access the normal information 207 corresponding to the know pose. When the three-dimensional geometry 201 is constructed by interpolating three-dimensional geometries representing known poses for the first person, the computing device 110 may interpolate the normal information corresponding to the known poses. When the three-dimensional geometry 201 is constructed based on a three-dimensional geometry representing the desired pose for a second person, the computing device 110 may access the normal information 207 corresponding to the desired pose for the second person. Although this disclosure describes determining normal information associated with a portion of the three-dimensional geometry that is visible from a viewing direction in a particular manner, this disclosure contemplates determining normal information associated with a portion of the three-dimensional geometry that is visible from a viewing direction in any suitable manner.

In particular embodiments, The computing device 110 may generate a virtual rendered image 209 for the first person in the desired pose by processing the second rendered neural texture 205 and the normal information 207 using the second neural network 105. The rendered image 209 for the first person may be a virtually rendered image that did not exist. The second neural network 105 may have been trained using a video stream of the first person taken from various viewing directions as training data. The second neural network 105 may also produce a mask 211 that is used for blending the generated rendered image 209 for the first person in the desired pose with a background. Although this disclosure describes generating a virtual rendered image for a person in a particular manner, this disclosure contemplates generating a virtual rendered image for a person in any suitable manner.

Figure 6:
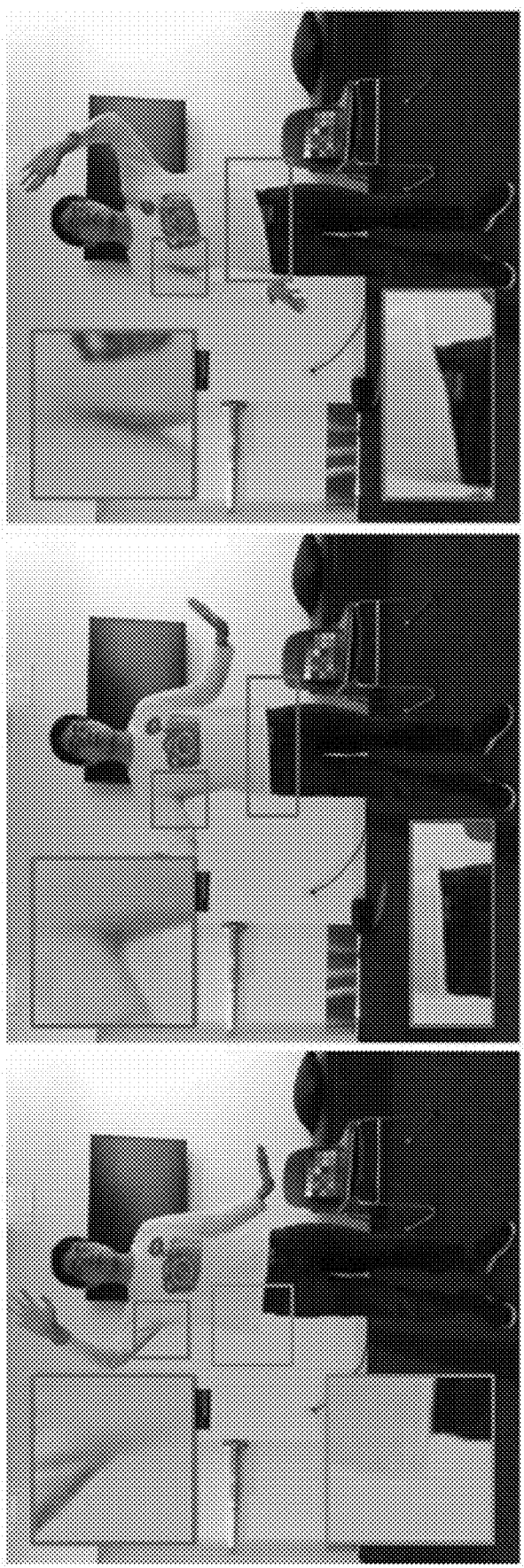
FIG. 6 illustrates example images that are virtually generated by the neural networks.

FIG. 6 illustrates example images that are virtually generated by the neural networks. The images in FIG. 6 may have been rendered on a challenging animation scenario with clothing deformations. The images in FIG. 6 demonstrate successful handling of deformations and painting regions outside of the body mesh. As highlighted in the images, region coverage as well as shading may be pose-dependent. The images in FIG. 6 are unseen poses for the person in the images. Additionally, the computing device 110 may able to temporally interpolate between a pose in an image and another pose and adjust the simulated clothing accordingly.

Figure 7:
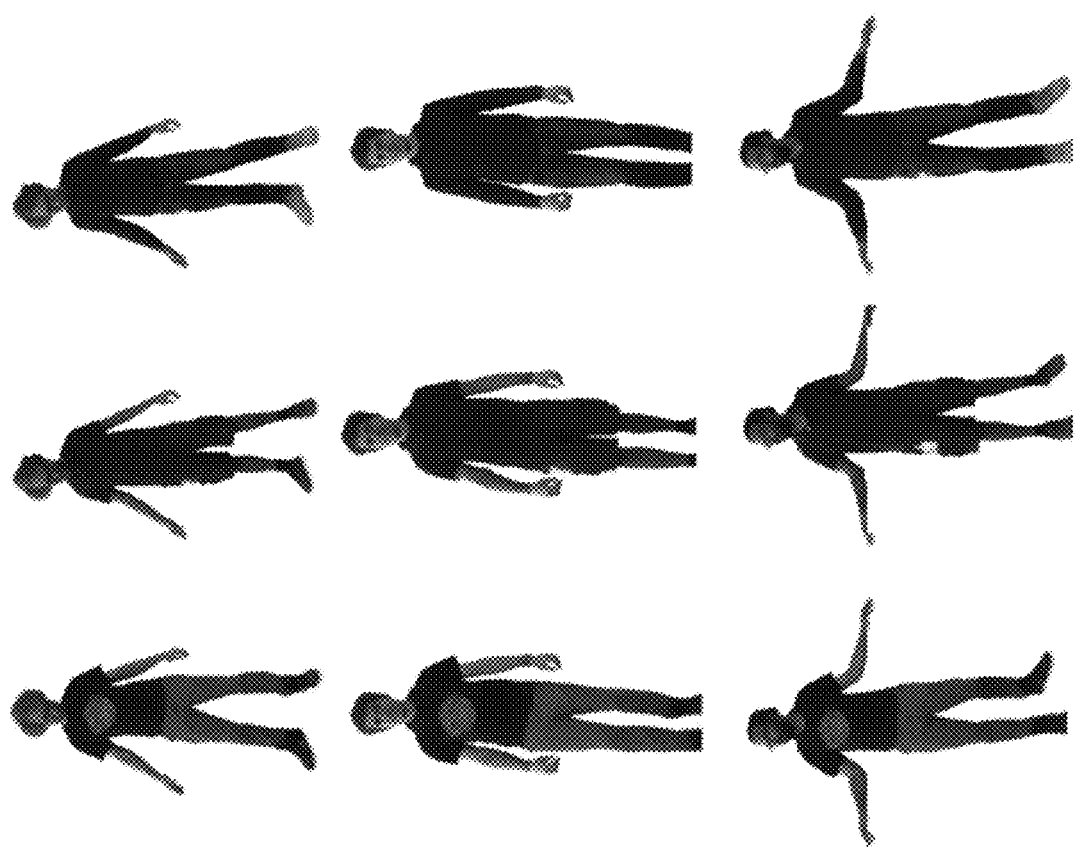
FIG. 7 illustrates example images of virtually generated altered appearances by swapping a part of the neural texture.

In particular embodiments, the rendered image 209 for the first person may be modified by swapping at least a part of the neural texture 101 with the corresponding part of a neural texture 101 encoding an appearance of a second person. The neural textures 101 for the first person and the second person may have been simultaneously trained as illustrated in FIG. 5. FIG. 7 illustrates example images of virtually generated altered appearances by swapping a part of the neural texture. In the example illustrated in FIG. 7, an identity of the person and pose are same along each row and the clothing is constant along each column. Once a plurality of neural textures corresponding to a plurality of persons are simultaneously trained with a first neural network 103 and a second neural network 105, the neural textures can be mix-and-matched between the neural textures. This feature may be utilized for applications such as a virtual try-on. Although this disclosure describes modifying a rendered image by swapping a part of the neural texture in a particular manner, this disclosure contemplates modifying a rendered image by swapping a part of the neural texture in any suitable manner.

Figure 8:
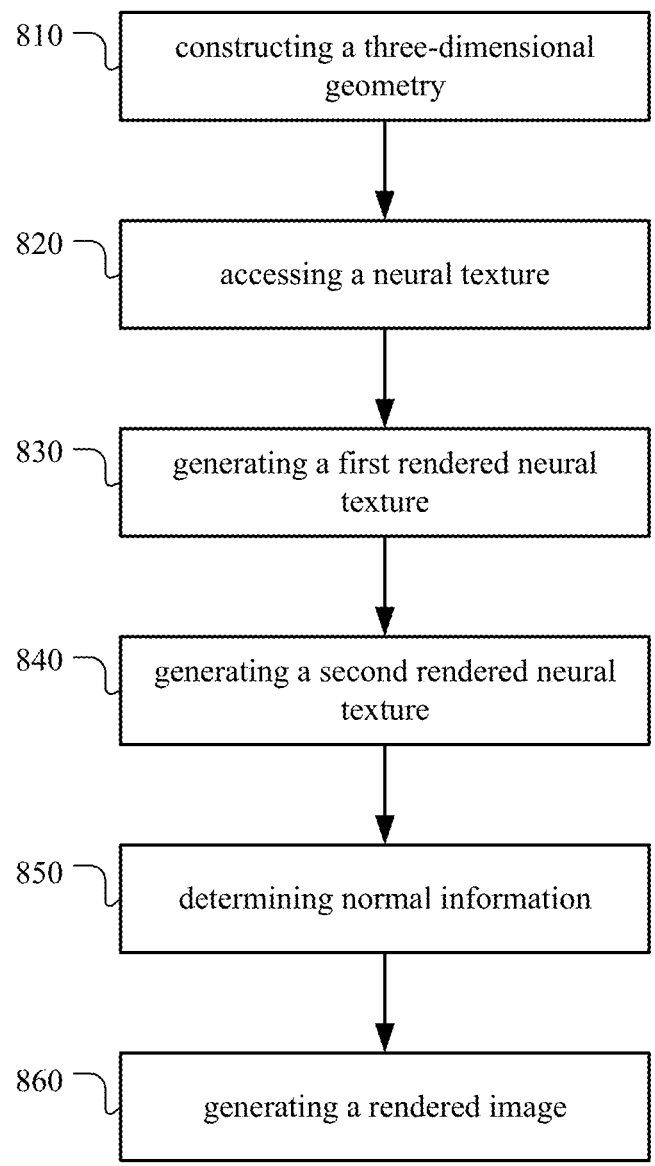
FIG. 8 illustrates an example method for generating a virtual image of a person using trained neural texture, a first neural network, and a second neural network.

FIG. 8 illustrates an example method 800 for generating a virtual image of a person using trained neural texture, a first neural network, and a second neural network. The method may begin at step 810, where the computing device may adjust parameters of a three-dimensional geometry corresponding to a first person to make the three-dimensional geometry represent a desired pose for the first person. At step 820, the computing device may access a neural texture encoding an appearance of the first person. At step 830, the computing device may generate a first rendered neural texture based on a mapping between (1) a portion of the three-dimensional geometry that is visible from a viewing direction and (2) the neural texture. The first rendered neural texture may comprise latent channels. At step 840, the computing device may generate a second rendered neural texture by processing the first rendered neural texture using a first neural network. The second rendered neural texture may comprise color channels and latent channels. At step 850, the computing device may determine normal information associated with the portion of the three-dimensional geometry that is visible from the viewing direction. At step 860, the computing device may generate a rendered image for the first person in the desired pose by processing the second rendered neural texture and the normal information using a second neural network. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a virtual image of a person using trained neural texture, a first neural network, and a second neural network including the particular steps of the method of FIG. 8, this disclosure contemplates any suitable method for generating a virtual image of a person using trained neural texture, a first neural network, and a second neural network including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
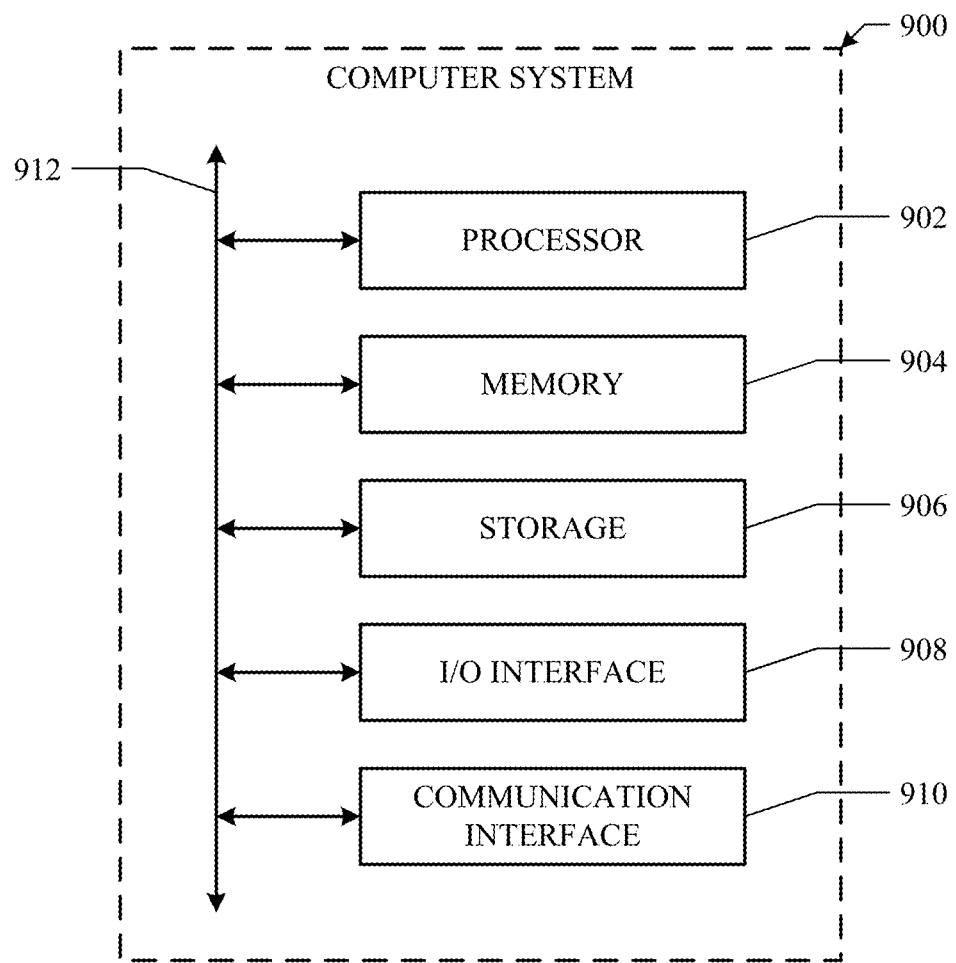
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   adjusting parameters of a three-dimensional geometry corresponding to a first person to make the three-dimensional geometry represent a desired pose for the first person;
   accessing a neural texture encoding an appearance of the first person;
   generating a first rendered neural texture based on a mapping between (1) a portion of the three-dimensional geometry that is visible from a viewing direction and (2) the neural texture, the first rendered neural texture comprising k latent channels;
   generating a second rendered neural texture by processing the first rendered neural texture using a first neural network, the second rendered neural texture comprising k channels, wherein first three channels of the k channels are color channels, and the remaining k−3 channels among the & channels are latent representation channels;
   determining normal information associated with the portion of the three-dimensional geometry that is visible from the viewing direction;
   generating a rendered image for the first person in the desired pose by processing the second rendered neural texture and the normal information using a second neural network.

2. The method of claim 1, wherein the three-dimensional geometry is constructed by interpolating three-dimensional geometries representing known poses for the first person.

3. The method of claim 1, wherein the three-dimensional geometry is constructed based on a three-dimensional geometry representing the desired pose for a second person.

4. The method of claim 1, wherein each texel of the neural texture has k-channel latent representation.

5. The method of claim 1, wherein the rendered image for the first person is modified by swapping at least a part of the neural texture with the corresponding part of a neural texture encoding an appearance of a second person.

6. The method of claim 5, the neural texture encoding the appearance of the first person and the neural texture encoding the appearance of the second person are simultaneously trained along with the first neural network and the second neural network.

7. The method of claim 1, wherein the second neural network also produces a mask that is used for blending the generated rendered image for the first person in the desired pose with a background.

8. The method of claim 1, wherein a process for training the neural texture encoding the appearance of the first person, the first neural network, and the second neural network comprises:
   accessing a video stream of the first person taken from various viewing directions;
   determining keyframes among a plurality of frames of the video stream that capture static salient appearances of the first person in the video stream;
   for each of the determined keyframes:
      generating a training rendered image for the first person in a training pose shown in the frame using the neural texture, the first neural network, and the second neural network;
      calculating losses by comparing the generated training rendered image and a ground truth image of the first person in the frame; and
      updating parameters of the neural texture, the first neural network, and the second neural network based on the calculated losses.

9. The method of claim 8, wherein generating the training rendered image for the first person in the training pose shown in the frame comprises:
   constructing a three-dimensional training geometry to represent the first person in the training pose shown in the frame based on a body shape model;
   generating a first training rendered neural texture based on a mapping between (1) a portion of the three-dimensional training geometry that is visible from a viewing direction of the frame and (2) the neural texture;
   generating a second training rendered neural texture by processing the first training rendered neural texture using the first neural network;

determining training normal information associated with the portion of the three-dimensional training geometry that is visible from the viewing direction; and generating the training rendered image for the first person in the training pose by processing the second training rendered neural texture and the training normal information using the second neural network.

10. The method of claim 8, wherein each frame of the video stream comprises an image with color channels.

11. The method of claim 8, wherein each determined keyframe is associated with a distinctive viewing direction.

12. The method of claim 8, wherein the first neural network and the second neural network are further trained using non-keyframes among the plurality of frames of the video stream after the training of the neural texture, the first neural network, and the second neural network using the determined keyframes is completed.

13. The method of claim 12, wherein the neural texture optimized with the keyframes is used for training the first neural network and the second neural network with the non-keyframes.

14. The method of claim 9, wherein the second training rendered neural texture comprises k-channels, wherein first three channels of the k-channels of the second training rendered neural texture are color channels, and wherein the rest k−3 channels among the k-channels of the second training rendered neural texture are latent representation channels.

15. The method of claim 14, wherein the first three channels of the k-channels of the second training rendered neural texture are enforced to be color channels by comparing the first three channels of the k-channels of the second training rendered neural texture with color channels of the frame as a part of calculating the losses.

16. The method of claim 8, wherein the losses comprise a red, green, and blue (RGB) loss, a feature loss, an adversarial loss, or a mask loss.

17. The method of claim 16, wherein the RGB loss is calculated based on a comparison between RGB channels of the generated training rendered image and RGB channels of the ground truth image of the first person in the frame.

18. The method of claim 16, wherein the feature loss is calculated based on a comparison between latent features extracted from the generated training rendered image and latent features extracted from the ground truth image of the first person in the frame.

19. One or more computer-readable non-transitory storage media embodying software that is operable when executed to:

adjust parameters of a three-dimensional geometry corresponding to a first person to make the three-dimensional geometry represent a desired pose for the first person;

access a neural texture encoding an appearance of the first person;

generate a first rendered neural texture based on a mapping between (1) a portion of the three-dimensional geometry that is visible from a viewing direction and (2) the neural texture, the first rendered neural texture comprising k latent channels;

generate a second rendered neural texture by processing the first rendered neural texture using a first neural network, the second rendered neural texture comprising k channels, wherein first three channels of the & channels are color channels, and the remaining k−3 channels among the k channels are latent representation channels;

determine normal information associated with the portion of the three-dimensional geometry that is visible from the viewing direction;

generate a rendered image for the first person in the desired pose by processing the second rendered neural texture and the normal information using a second neural network.

20. A system comprising: one or more processors; and a non-transitory memory coupled to the processors comprising instructions executable by the processors, the processors operable when executing the instructions to:

adjust parameters of a three-dimensional geometry corresponding to a first person to make the three-dimensional geometry represent a desired pose for the first person;

access a neural texture encoding an appearance of the first person;

generate a first rendered neural texture based on a mapping between (1) a portion of the three-dimensional geometry that is visible from a viewing direction and (2) the neural texture, the first rendered neural texture comprising k latent channels;

generate a second rendered neural texture by processing the first rendered neural texture using a first neural network, the second rendered neural texture comprising k channels, wherein first three channels of the k channels are color channels, and the rest k−3 channels among the k channels are latent representation channels;

determine normal information associated with the portion of the three-dimensional geometry that is visible from the viewing direction;

generate a rendered image for the first person in the desired pose by processing the second rendered neural texture and the normal information using a second neural network.

* * * * *